US009092397B1

(12) United States Patent
Kurtz et al.

(10) Patent No.: US 9,092,397 B1
(45) Date of Patent: Jul. 28, 2015

(54) DEVELOPMENT SERVER WITH HOT STANDBY CAPABILITIES

(71) Applicant: Sprint Communications Company L.P., Overland Park, KS (US)

(72) Inventors: Matthew Kurtz, Altamonte Springs, FL (US); Kevin Murphy, Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 138 days.

(21) Appl. No.: 13/844,122

(22) Filed: Mar. 15, 2013

(51) Int. Cl.
G06F 11/00 (2006.01)
G06F 11/20 (2006.01)

(52) U.S. Cl.
CPC .................................. G06F 11/2023 (2013.01)

(58) Field of Classification Search
USPC .................................................. 714/4.12, 10
See application file for complete search history.

(56) References Cited

U.S. PATENT DOCUMENTS

| 7,512,832 B1* | 3/2009 | Lent et al. ..................... 714/4.11 |
| 2007/0101186 A1* | 5/2007 | Chen ................................. 714/6 |
| 2009/0235119 A1* | 9/2009 | Idemori et al. ................... 714/27 |
| 2012/0144006 A1* | 6/2012 | Wakamatsu et al. .......... 709/220 |
| 2012/0159267 A1* | 6/2012 | Gyorffy ........................... 714/55 |
| 2012/0216069 A1* | 8/2012 | Bensinger ......................... 714/3 |

* cited by examiner

Primary Examiner — Sarai Butler

(57) ABSTRACT

A method for managing a database comprises causing a standby server to provide a development platform; causing the standby server to mimic an authenticating media access control (MAC) address of a primary server; causing the primary server to transfer data to the standby server in order to provide a backup of the data on the standby server; determining that the primary server is not able to perform one or more functions; provisioning the standby server, in response to determining that the primary server is not able to perform the one or more functions, to perform the one or more functions; and causing the standby server, after provisioning the standby server, to perform the one or more functions, wherein the one or more functions are verified via the mimicked authenticating MAC address.

20 Claims, 4 Drawing Sheets

DEVELOPMENT SERVER WITH HOT STANDBY CAPABILITIES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A communications network such as a mobile telephone network may include software stored on components of the network such as servers. The software may collect data and store that data in databases located on other servers throughout the network. The databases and supporting components may be referred to as a database management system. The software can serve a variety of purposes, including implementation and quality control. For instance, the software may monitor network performance and store in the databases the data that it chooses to collect and store. Subsequently, that data may be analyzed in order to determine issues in the network or to identify areas to improve network efficiency. In other words, the data may be used to improve network performance. The data may be critical to network implementation, so it may be necessary to ensure continued database operability.

SUMMARY

In an embodiment, a method for managing a database is disclosed. The method comprises causing a standby server to provide a development platform; causing the standby server to mimic an authenticating media access control (MAC) address of a primary server; causing the primary server to transfer data to the standby server in order to provide a backup of the data on the standby server; determining that the primary server is not able to perform one or more functions; provisioning the standby server, in response to determining that the primary server is not able to perform the one or more functions, to perform the one or more functions; and causing the standby server, after provisioning the standby server, to perform the one or more functions, wherein the one or more functions are verified via the mimicked authenticating MAC address.

In another embodiment, a method for managing a database is disclosed. The method comprises providing a development environment; mimicking an authenticating media access control (MAC) address of a primary server; receiving data from the primary server in order to provide a backup of the data; being provisioned, in response to a determination that the primary server is not able to perform one or more functions, to perform the one or more functions; and performing, after being provisioned, the one or more functions, wherein the one or more functions are verified via the mimicked authenticating MAC address.

In yet another embodiment, a database standby server is disclosed. The database standby server comprises a memory; a processor; and an application stored in the memory that, when executed by the processor, is configured to: provide a development environment, mimic an authenticating media access control (MAC) address of a primary server, receive data from the primary server in order to provide a backup of the data, be provisioned, in response to a determination that the primary server is not able to perform one or more functions, to perform the one or more functions; and perform, after being provisioned, the one or more functions, wherein the one or more functions are verified via the mimicked authenticating MAC address.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A server, like any other computer hardware component, may experience operability issues or cease to operate at all. When a server contains a database with implementation and quality control data, it may be desirable to either promptly restore operability of the server or provide alternative means to access the data and provide storage space for new data. Alternative access may be accomplished by providing a standby server that contains the same or nearly the same data as the original, primary server that has experienced the operability issues. Sometimes, the software that collects the data for the databases may require authentication in order to operate or fully operate. Authentication may refer to the software verifying whether or not a component is authorized to use the software. Presumably, the software is properly authenticated on the primary server, as the primary server is the server that is typically running and communicating with the software. When the standby server assumes responsibility from the primary server for storing and collecting the data, however, it may be desirable for the standby server to mimic characteristics of the primary server, for example the media access control (MAC) address of the primary server, in order for the software to fully operate.

Figure 1:
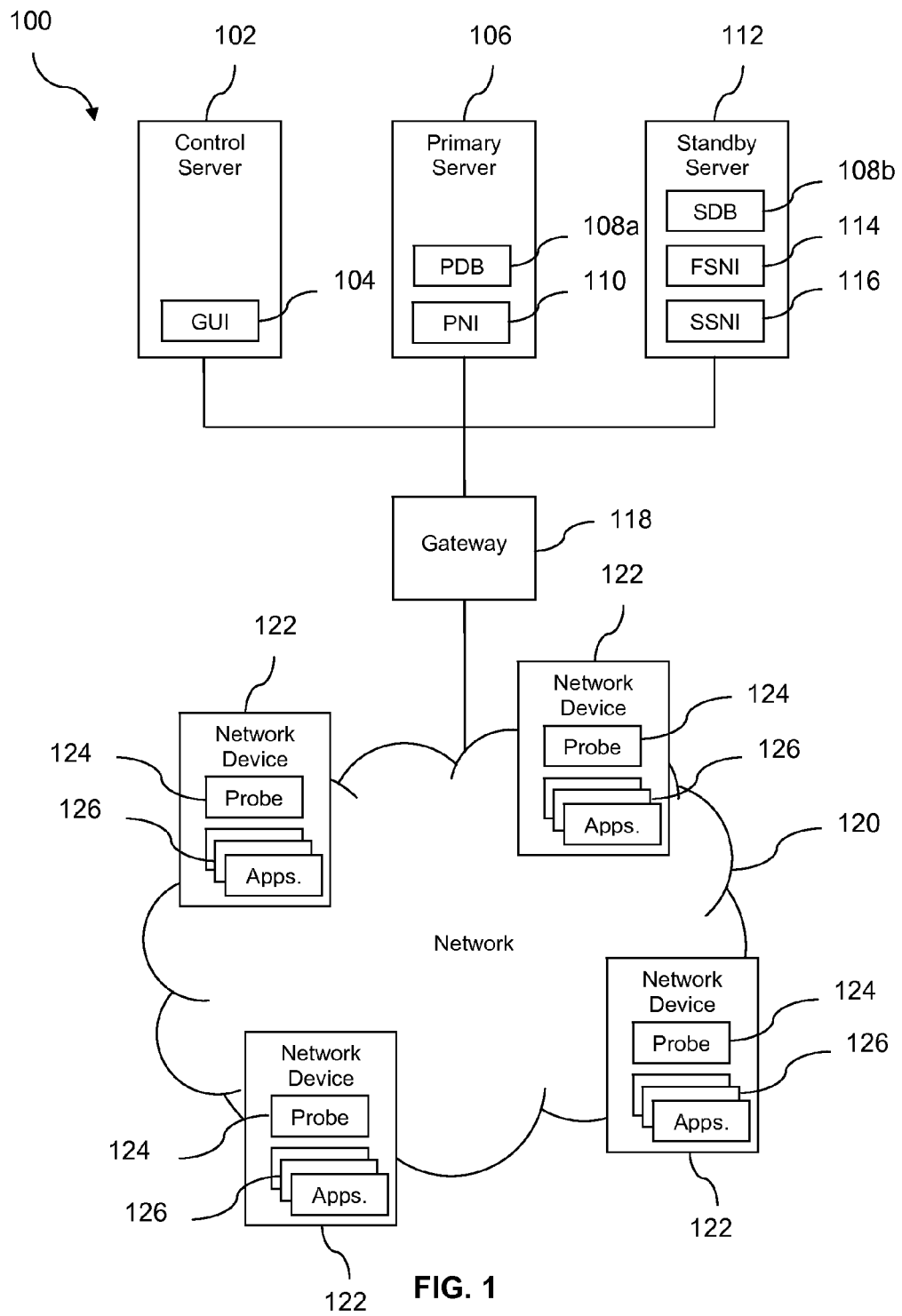
FIG. 1 is an illustration of a database management system according to an embodiment of the disclosure.

Turning now to FIG. 1, a database management system 100 is described. The database management system 100 may comprise a control server 102 communicatively coupled to a primary server 106 and a standby server 112. Together, the control server 102, primary server 106, and standby server 112 may be communicatively coupled to a plurality of network devices 122 via a gateway 118 and a network 120. The control server 102, primary server 106, and standby server 112 may form part or all of a local area network (LAN) such as a data center.

The control server 102 may be a hardware computer server and may monitor, provide access to and from, and provide control of the primary server 106 and the standby server 112. The control server 102 may provide such functionality to a user through a graphical user interface (GUI) 104. The GUI 104 may be part of an operating system that may provide multiple-purpose functionality. In monitoring the primary server 106 and the standby server 112, the control server 102 may, for example, ensure that the primary server 106 and the standby server 112 are functioning as intended. In other words, the control server 102 may monitor for any crashes. In providing access to and from the primary server 106 and the standby server 112, the control server 102 may allow the primary server 106 and the standby server 112 to communicate with the network devices 122 via the gateway 118 and the network 120. The control server 102 may establish privileges, protocols, and routing for communication involving the primary server 106 and the standby server 112. In providing control of the primary server 106 and the standby server 112, the control server 102 may allow the user to establish certain behavior for the primary server 106 and the standby server 112. For example, the control server 102 may allow the user to direct the transfer of data between the primary server 106 and the standby server 112. The user may establish certain rules so that data transfers between the primary server 106 and the standby server 112 occur on a regular basis. While the control server 102 is described as providing various functions, it is understood that other network components may provide those functions as well.

The primary server 106 may be a single hardware computer server or a plurality of hardware computer servers dedicated to providing a database or databases. The primary server 106 may comprise a primary database 108a and a primary network interface 110. The primary database 108a may store data from any source designated by the control server 102. For example, the control server 102 may instruct the primary server 106 to communicate with the network devices 122 and copy data from the network devices 122 to the primary database 108a. The primary database 108a may be arranged in any structure designated by the control server 102 and may be, for example, a Structured Query Language (SQL) database. The primary network interface 110 may provide an interface for the primary server 106 to communicate with the control server 102, standby server 112, and network devices 122. The primary network interface 110 may be associated with an actual/authenticating MAC address, a unique identifier (UID) that permits other network components to identify and communicate with the primary server 106. The primary network interface 110 may be associated with other UIDs as well.

The standby server 112 may also be a hardware computer server dedicated to providing a database. The standby server 112 may comprise a standby database 108b, a first standby network interface 114, and a second standby network interface 116. The standby database 108b may store data from any source designated by the control server 102. For example, the control server 102 may instruct the standby server 112 to communicate with the primary server 106 and copy data from the primary database 108a to the standby database 108b. The standby database 108b may be arranged in any structure designated by the control server 102 and may be, for example, an SQL database. The first standby network interface 114 may provide an interface for the standby server 112 to communicate with the control server 102, primary server 106, and network devices 122. The first standby network interface 114 may be associated with an actual MAC address that permits other network components to identify and communicate with the standby server 112. The second standby network interface 116 may not communicate with the control server 102, primary server 106, or network devices 122, but may instead be dedicated to providing an association with an authenticating MAC address. The authenticating MAC address may not be the actual MAC address for the standby server 112, but may be a different MAC address that is mimicked in order to accomplish various functions, some of which are described more fully below. The first standby network interface 114 and the second standby network interface 116 may both be associated with other UIDs as well. The control server 102 may be implemented on the standby server 112. In other words, the standby server 112 may perform all of the functions described above for the control server 102.

The gateway 118 may serve as an interface between the control server 102, primary server 106, and standby server 112 on the one hand and the network 120 and network devices 122 on the other hand. The gateway 118 may translate and convert network protocols in order to provide communication among those components. In addition, the gateway 118 may operate at any network layer.

The network 120 may be any network providing for communication among the communicatively coupled network devices 122. For example, the network 120 may be the Internet, a mobile telephone network, or a customer network. The network 120 may allow communication along wired or wireless channels.

The network devices 122 may be mobile telephones, personal computers, servers, or other network devices. The network devices 122 may comprise probes 124 and applications 126. The probes 124 may provide multiple functions. For example, the probes 124 may be software application modules that are part of a software application package and that monitor, report, and manage performance of the network devices 122 over the network 120. If the network devices 122 are endpoints such as mobile telephones and personal computers, then the probes 124 may monitor, report, and manage performance of their respective applications 126. If the network devices 122 are servers, then the probes 124 may monitor, report, and manage performance of a set of other communicatively coupled network components (not shown) in the network 120. The probes 124 may comprise a cache to store data for a finite period of time and may require authentication via a MAC address or other UID before communicating with other network components. The applications 126 may be any type of software applications designed to perform specific tasks.

In an embodiment, the probes 124 may monitor and collect data related to traffic over the network 120. For example, the probes 124 may collect survey data in the form of network bandwidth utilization reports. If the network devices 122 are endpoints, then the utilization reports may indicate the percentage of bandwidth dedicated to each application 126 on each probe's 124 respective network device 122. If the network devices 122 are servers, then the utilization reports may indicate the percentage of bandwidth dedicated to each of a set of other communicatively coupled network devices (not shown) in the network 120. The probes 124 may not be limited to utilization reports, but may also monitor and collect data related to other metrics. For example, the probes may also monitor, collect, and analyze date to generate metrics pertaining to service level agreements (SLA).

The probes 124 may then send the data they collect to the primary server 106 via the network 120, gateway 118, and primary network interface 110. In addition, the probes 124 may store the data in their respective caches, for example, for 24 hours. Upon receiving the data from the probes 124, the primary server 106 may store the data in its primary database 108*a*. The control server 102 may direct when the probes 124 collect data and send that data to the primary server 106. For example, the control server 102 may direct the probes 124 to collect data every 10 minutes and send that data to the primary server 106 every hour. The probes 124 may authenticate the primary server 106 via the actual/authenticating MAC address of the primary network interface 110. Authentication may be a prerequisite for the probes 124 to be able to communicate or fully communicate with the primary server 106.

While the control server 102 directs the flow of data from the probes 124 to the primary server 106, the standby server 112 may provide an environment to develop, test, and analyze software and other tools and data while maintaining no contact with the probes 124. In that respect, the standby server 112 may also be referred to as a development server. Conversely, as the primary server 106 maintains contact with the probes 124 and is chiefly responsible for storing the data, the primary server 106 may be referred to as a production server. In addition, the control server 102 may direct the primary server 106 to copy all of the data from the primary database 108*a* to the standby database 108*b*. In that respect, the standby server 112 may also be referred to as a backup server. The control server 102 may direct the copying of the data from the primary database 108*a* to the standby database 108*b* at specified times, for example, at midnight every night.

Occasionally, the control server 102 may detect that the primary server 106 is experiencing operability issues or is ceasing to operate at all. For that reason, the control server 102 may determine that the primary server 106 is not receiving data from the probes 124 properly or at all. In that case, the control server 102 may provision the standby server 112 to assume the responsibilities of the primary server 106. Those responsibilities may include receiving data from the probes 124. Provisioning may refer to the process of preparing and equipping a network component to provide one or more functions. The control server 106 may then direct the standby server 112 to assume the responsibilities of the primary server 106. While the issues of the primary server 106 may be addressed and the primary server 106 may resume full operability at some point, full operability may not occur before the probes 124 lose data in their respective caches, for example, if the probes can store data for only two days in their respective caches but full operability does not resume until after those two days. In that case, it may be desirable for the standby server 112 to assume the responsibilities of the primary server 106 before the probes 124 begin to lose data in their respective caches, thus ensuring that no data is lost.

As the standby server 112 may regularly receive data from the primary server 106 and may be ready to assume the responsibilities of the primary server 106, the standby server 112 may also be referred to as a hot server. As an alternative, the standby server 112 may be operated only when needed and thus be referred to as a cold server. As another alternative, the standby server 112 may be updated periodically and then operated when needed, and thus be referred to as a warm server.

Because the primary server 106 and standby server 112 are different devices, they may have different MAC addresses. If the probes 124 can authenticate the primary server 106 via the actual/authenticating MAC address of the primary server 106, but the probes cannot authenticate the standby server 112 via the actual MAC address of the standby server 112, then it may be suitable to employ the authenticating MAC address of the standby server 112. The authenticating MAC address of the standby server 112 may be the same MAC address as the actual/authenticating MAC address of the primary server 106. In other words, the standby server 112 may mimic the actual/authenticating MAC address of the primary server 106. Mimicking a MAC address may refer to a first component providing to a second component a MAC address that is not the actual MAC address of the first component. The mimicking may be done using various software tools or direct registry key alterations via the control server 102. Once the standby server 112 mimics the actual/authenticating MAC address of the primary server 106, the probes 124 may authenticate the standby server 112 via the authenticating MAC address of the second standby network interface 116. The standby server 112 may continue communication with the probes 124 and other network components via the first standby network interface 114 that is associated with the actual MAC address of the standby server 112. In that respect, the first standby network interface 114 may be said to be active, up, or online. If, however, the primary network interface 110 associated with the actual/authenticating MAC address of the primary server 106 and the second standby network interface 116 associated with the authenticating MAC address of the standby server 112 were to communicate with the probes 124 and other network components at the same time, then issues may occur. Accordingly, the second standby network interface 116 associated with the authenticating MAC address may not be communicatively coupled to the probes 124 and other network components. Rather, the second standby network interface 116 may only serve as an authentication tool. In that respect, the second standby network interface 116 may be said to be inactive, downed, or offline, at least with respect to the network 120 or the LAN that the standby server 112 forms with the control server 102 and primary server 106. The standby server 112 may, however, remain active, up, or online with respect to another LAN or network (not shown). The probes 124 may authenticate the standby server 112 using other UIDs as well.

After authenticating the standby server 112, the control server 102 or standby server 112 may request, and the probes 124 may send from their respective caches, data that the standby server 112 has not already received from the primary server 106 in a prior data transfer. In addition, the probes 124 may then send the data that they subsequently collect to the standby server 112. The probes 124 may send the data via the network 120, gateway 118, and first standby network interface 114. Upon receiving the data from the probes 124, the standby server 112 may store the data in its standby database 108*b*. The control server 102 may direct when the probes 124 collect data and send that data to the standby server 112. For example, the control server 102 may direct the probes 124 to collect data every 10 minutes and send that data to the standby server 112 every hour.

Subsequently, the control server 102 may detect that the primary server's 106 operability issues have been addressed so that the primary server 106 may fully operate again. In that case, the control server 102 may direct the standby server 112 to copy all of the data from the standby database 108*b* to the primary database 108*a*. The control server 102 may then provision and direct the primary server 106 to resume its original responsibilities. The probes 124 may authenticate the primary server 106 via the primary network interface 110 associated with the actual/authenticating MAC address of the primary server 106, send from their respective caches data to the primary server 106, and send the data that they subsequently collect to the primary server 106. Once again, the control server 102 may direct when the probes 124 collect data and send that data to the primary server 106. For example, the control server 102 may direct the probes 124 to collect data every 10 minutes and send that data to the primary server 106 every hour.

The standby server 112 may be said to be application-independent because it may not be limited to receiving data from the probes 124. Rather, the standby server 112 may receive data from other software applications in the network 120 or elsewhere. The standby server 112 may be said to be database-specific because it may be designated for providing a standby database 108b that is a backup of the primary database 108a.

Figure 2:
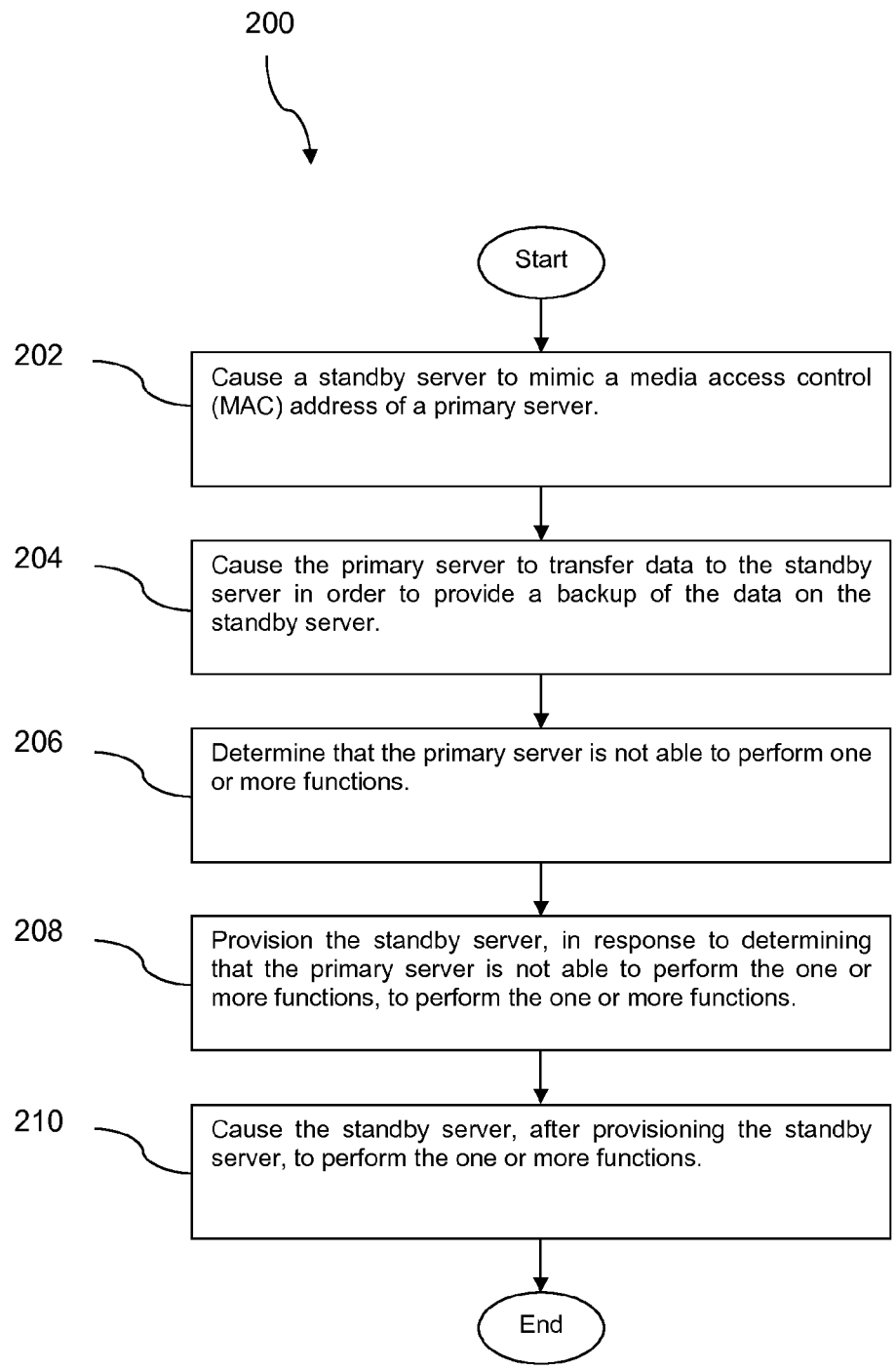
FIG. 2 is a flowchart illustrating a method for managing a database according to an embodiment of the disclosure.

Turning now to FIG. 2, a method 200 for managing a database is described. At block 202, a standby server may be caused to mimic a media access control (MAC) address of a primary server. For example, the control server 102 may cause the standby server 112 to mimic the MAC address of the primary server 106 via the second standby network interface 116 of the standby sever 112. The MAC address, which may be the authenticating MAC address of the standby server 112, may be the same as the actual/authenticating MAC address associated with the primary network interface 110 of the primary server 106.

At block 204, the primary server may be caused to transfer data to the standby server in order to provide a backup of the data on the standby server. For example, the control server 102 may cause the primary server 106 to transfer data from the primary database 108a of the primary server 106 to the standby database 108b of the standby server 112.

At block 206, it may be determined that the primary server is not able to perform one or more functions. For example, the control server 102 may determine that the primary server 106 is experiencing operability issues or is ceasing to operate at all and that the primary server 106 is no longer able to receive data from the probes 124 properly or at all.

At block 208, the standby server may be provisioned, in response to determining that the primary server is not able to perform the one or more functions, to perform the one or more functions. For example, the control server 102 may provision the standby server 112 to receive the data from the probes 124.

At block 210, the standby server may be caused, after provisioning the standby server, to perform the one or more functions. For example, the control server 102 may cause the standby server 112 to receive the data from the probes 124.

Figure 3:
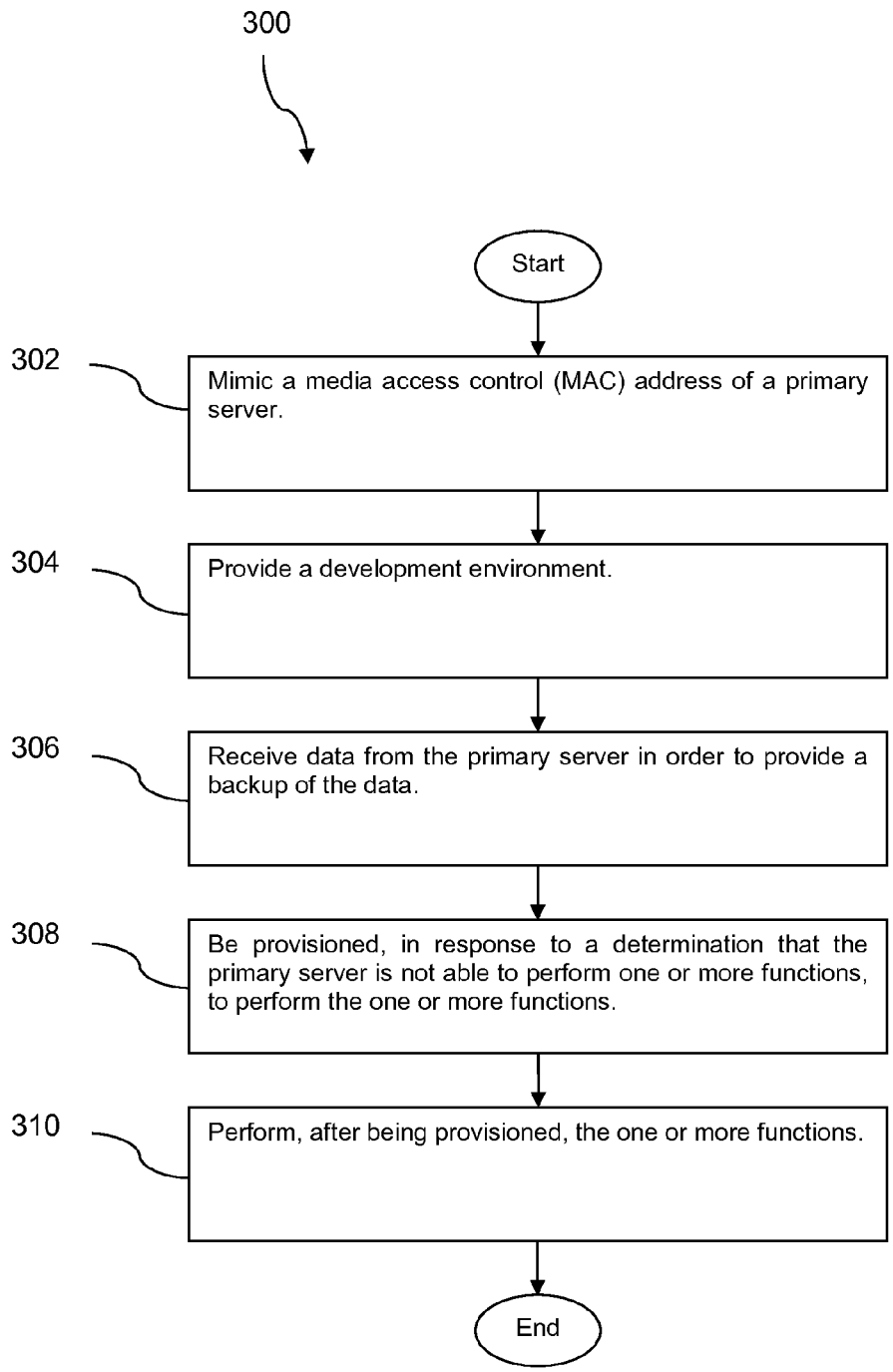
FIG. 3 is another flowchart illustrating a method for managing a database according to an embodiment of the disclosure.

Turning now to FIG. 3, a method 300 for managing a database is described. At block 302, a media access control (MAC) address of a primary server may be mimicked. For example, the standby server 112 may mimic the actual/authenticating MAC address of the primary server 106 via the second standby network interface 116 of the standby server 112.

At block 304, a development environment may be provided. For example, the standby server 112 may provide a development environment to develop, test, and analyze software and other tools and data while maintaining no contact with the probes 124.

At block 306, data may be received from the primary server in order to provide a backup of the data. For example, the standby server 112 may receive in its standby database 108b data from the primary database 108a of the primary server 106. The data may originally be from the probes 124.

At block 308, in response to a determination that the primary server is not able to perform one or more functions, something may be provisioned to perform the one or more functions. For example, the standby server 112 may be provisioned to receive the data from the probes 124.

At block 310, after being provisioned, the one or more functions may be performed. For example, the standby server 112 may receive the data from the probes 124.

Figure 4:
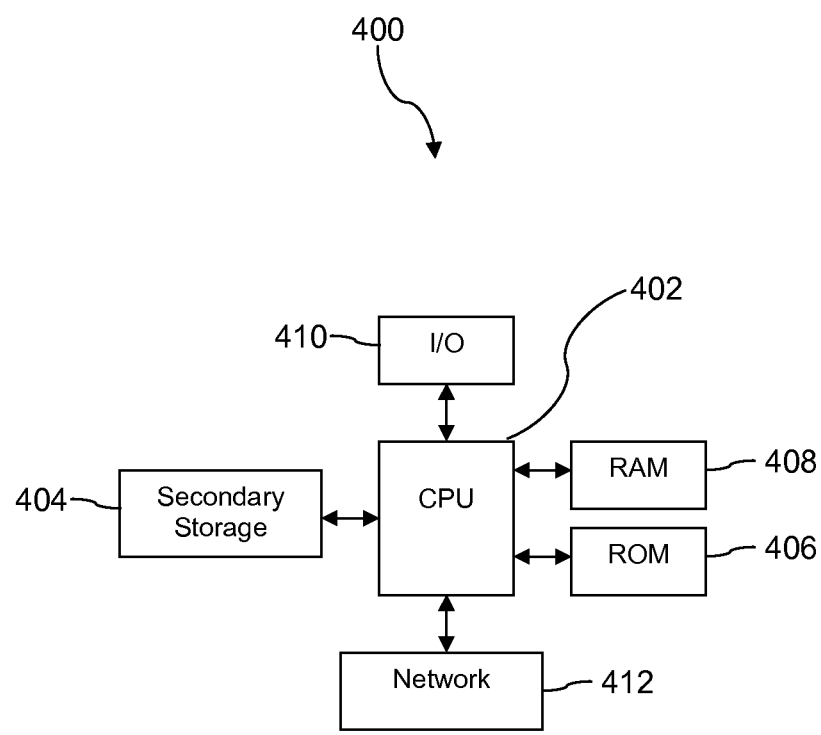
FIG. 4 is an illustration of a computer system suitable for implementing the several embodiments of the disclosure.

Turning now to FIG. 4, a computer system 400 suitable for implementing one or more embodiments disclosed herein is described. For example, the computer system 400 may be suitable for implementing the control server 102, primary server 106, standby server 112, gateway 118, and network devices 122. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, RAM 408, and ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner that a machine controlled by a new ASIC is a particular machine or apparatus, a computer that has been programmed and/or loaded with executable instructions may be viewed as a particular machine or apparatus.

The secondary storage 404 is typically comprised of one or more disk drives or tape drives and is used for non-volatile storage of data and as an over-flow data storage device if the RAM 408 is not large enough to hold all working data. The secondary storage 404 may be used to store programs which are loaded into the RAM 408 when such programs are selected for execution. The ROM 406 is used to store instructions and perhaps data which are read during program execution. The ROM 406 is a non-volatile memory device which typically has a small memory capacity relative to the larger memory capacity of the secondary storage 404. The RAM 408 is used to store volatile data and perhaps to store instructions. Access to both the ROM 406 and the RAM 408 is typically faster than to the secondary storage 404. The secondary storage 404, RAM 408, and/or ROM 406 may be referred to in some contexts as computer readable storage media and/or non-transitory computer readable media.

The I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using the processor 402, may be received from and outputted to the network, for example, in the form of a computer data signal embodied in a carrier wave.

Such information, which may include data or instructions to be executed using the processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 402 executes instructions, codes, computer programs, and scripts, which it accesses from a hard disk, a floppy disk, an optical disk (these various disk-based systems may all be considered the secondary storage 404), the ROM 406, the RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, the ROM 406, the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, ROM 406, and RAM 408 may be referred to as a non-transitory computer readable medium or a computer readable storage media. A dynamic RAM embodiment of the RAM 408 likewise may be referred to as a non-transitory computer readable medium in that, while the dynamic RAM receives electrical power and is operated in accordance with its design, for example during a period of time during which the computer 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing a database, the method comprising:
   causing a standby server to provide a development platform for the database, wherein the standby server comprises a first interface and a second interface;
   mimicking, on the second interface of the standby server, an authenticating media access control (MAC) address of a primary server;
   causing the primary server to transfer data to the standby server in order to provide a backup of the data on the standby server;
   determining that the primary server is not able to perform one or more functions;
   in response to determining that the primary server is not able to perform the one or more functions, provisioning the standby server, to perform the one or more functions over the first interface using an actual MAC address that is different from the authenticating MAC address; and
   after provisioning the standby server, causing the standby server to perform the one or more functions over the first interface using the actual MAC address, wherein the one or more functions are verified via the mimicked authenticating MAC address.

2. The method of claim 1, further comprising causing the standby server, to receive cached data from at least one probe.

3. The method of claim 2,
   wherein the at least one probe resides on at least one customer network; and
   wherein the at least one probe obtains survey data from the at least one customer network.

4. The method of claim 1,
   wherein the first interface is unassociated with the authenticating MAC address;
   wherein the first interface is communicatively coupled to at least one network in addition to a local area network (LAN); and
   wherein the standby server performs the one or more functions over the first interface using the actual MAC address.

5. The method of claim 1,
   wherein the standby server mimics the authenticating MAC address on the second interface; and
   wherein the second interface is not communicatively coupled to a network associated with the primary server.

6. The method of claim 1, further comprising:
   after causing the standby server to perform the one or more functions, determining that the primary server is able to perform the one or more functions;
   in response to determining that the primary server is able to perform the one or more functions, causing the standby server to transfer data to the primary server;
   in response to determining that the primary server is able to perform the one or more functions, provisioning the primary server to perform the one or more functions; and
   after provisioning the primary server, causing the primary server to perform the one or more functions.

7. The method of claim 1, wherein the one or more functions comprises receiving data from at least one probe.

8. A method for managing a database, the method comprising:
   providing a development environment by a standby server for the database, wherein the standby server comprises a first interface and second interface;
   mimicking, on the second interface of the standby server, an authenticating media access control (MAC) address of a primary server;
   receiving, by the standby server, data from the primary server in order to provide a backup of the data;
   in response to a determination that the primary server is not able to perform one or more functions, provisioning the standby server to perform the one or more functions over the first interface using an actual MAC address that is different from the authenticating MAC address; and
   subsequent to the provisioning, performing, by the standby server, the one or more functions over the first interface using the actual MAC address, wherein the one or more functions are verified via the mimicked authenticating MAC address.

9. The method of claim 8, wherein the one or more functions comprises communicating with at least one probe and providing a database of data received from the at least one probe.

10. The method of claim 8, further comprising:
    requesting, by the standby server, after being provisioned, cached data from at least one probe; and
    receiving, by the standby server, after requesting from the at least one probe, the cached data from the at least one probe.

11. The method of claim 10, further comprising receiving, by the standby server, after receiving the cached data from the at least one probe, additional data from the at least one probe.

12. The method of claim 11, wherein the additional data is received in response to at least one request.

13. The method of claim 11, wherein the additional data is received at regular intervals.

14. The method of claim 10,
    wherein a software package comprises the at least one probe;
    wherein the software package authenticates its use using the authenticating MAC address;
    wherein the at least one probe resides on at least one customer network; and
    wherein the at least one probe obtains survey data from the at least one customer network.

15. The method of claim 8, further comprising providing the first interface,
    wherein the first interface is unassociated with the authenticating MAC address;
    wherein the first interface is communicatively coupled to at least one network in addition to a local area network (LAN); and
    wherein the one or more functions are performed over the first interface using the actual MAC address.

16. The method of claim 8, further comprising providing the second interface,
    wherein the authenticating MAC address is mimicked on the second interface; and wherein the second interface is not communicatively coupled to a network associated with the primary server.

17. A database standby server comprising:
a non-transitory memory;
at least one processor;
a first interface that is configured for association with an actual media access control (MAC) address;
a second interface that is configured for association with an authenticating MAC address of a primary server; and
an application stored in the non-transitory memory that, when executed by the at least one processor:
provides a development environment for a communicatively coupled database,
mimics, on the second interface, the authenticating media access control (MAC) address of the primary server,
receives data from the primary server in order to provide a backup of the data,
determines that the primary server is not able to perform one or more functions,
responsive to the determination, implements provisioning to perform the one or more functions over the first interface using the actual MAC address that is different from the authenticating MAC address; and
subsequent to being provisioned, performs the one or more functions over the first interface using the actual MAC address, wherein the one or more functions are verified via the mimicked authenticating MAC address on the second interface.

18. The standby server of claim 17,
wherein the first interface is unassociated with the authenticating MAC address, and is configured to communicatively couple to at least one network other than a local area network (LAN);
wherein the standby server is configured to perform the one or more functions over the first interface using the actual MAC address; and
wherein the second interface, is not configured to communicatively couple to a network associated with the primary server.

19. The standby server of claim 17, wherein the application is further configured to:
request cached data from at least one probe; and
received the cached data from the at least one probe.

20. The standby server of claim 19, wherein the application is further configured to receive additional data from the at least one probe.

* * * * *